United States Patent [19]

Tanis et al.

[11] Patent Number: 5,145,462
[45] Date of Patent: Sep. 8, 1992

[54] INFEED ASSEMBLY FOR AN AXIAL-FLOW COMBINE

[75] Inventors: Dale R. Tanis, Naperville; Robert A. Matousek, Minooka; Richard E. McMillen, Plainfield, all of Ill.

[73] Assignee: Case Corporation, Racine, Wis.

[21] Appl. No.: 713,055

[22] Filed: Jun. 10, 1991

[51] Int. Cl.$^5$ ............................................. A01F 12/10
[52] U.S. Cl. ......................................... 460/68; 460/70
[58] Field of Search ...................... 460/70, 68, 79, 66, 460/69

[56] References Cited

U.S. PATENT DOCUMENTS

| | | | |
|---|---|---|---|
| 3,537,460 | 11/1970 | Van Baskirk | 460/68 |
| 3,572,346 | 3/1971 | Knapp et al. | 460/68 |
| 3,827,443 | 8/1974 | Drayer . | |
| 3,964,492 | 6/1976 | Crego et al. | 460/68 |
| 4,148,323 | 4/1979 | McMillen et al. . | |
| 4,248,248 | 2/1981 | DeBusscher et al. | 460/68 |
| 4,250,896 | 2/1981 | Wagstaff et al. . | |
| 5,045,025 | 9/1991 | Underwood | 460/70 X |

Primary Examiner—Terry Lee Melius
Attorney, Agent, or Firm—Dressler, Goldsmith, Shore, Sutker & Milnamow, Ltd.

[57] ABSTRACT

An infeed assembly for an axial-flow combine arranged at a forward end of a rotor which is mounted within a casing defining a transition section at a forward end thereof. The transition section has a series of spiral transport vanes on an inner surface thereof. The infeed assembly is comprised of a series of equally spaced blades. Each blade has a leading edge, an outer edge, and a material engaging surface. The leading edge of the blade, which is peripherally rounded, is swept back relative to the given direction of rotor rotation. The outer blade edge extends from the leading edge and angles relative to the transport vanes in varying degrees as the blade extends rearwardly from the leading edge. The material engaging surface of the blade has a generally concave shaped section extending axially rearward from the leading edge of the blade and which extends into a relatively flat shape section. The curved concave and flattened sections of each impeller blade have cross-sectional profiled configurations lying on planes extending normal to the rotational axis of the rotor and which are incrementally swept back at substantially the same angle of crop deflection as the leading edge of the blade. Anti-wrap mechanism provided at a forward end of the rotor inhibits crop material from winding about the rotor.

7 Claims, 8 Drawing Sheets

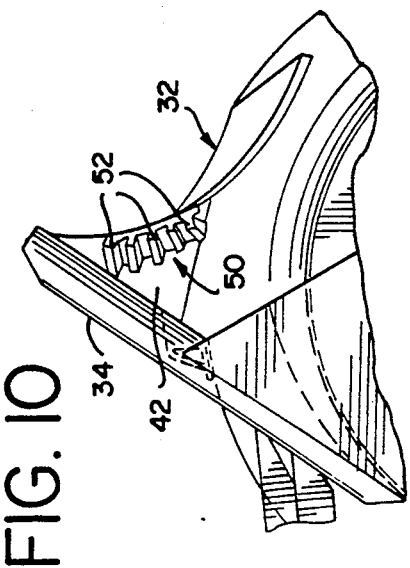
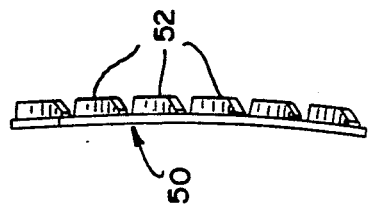
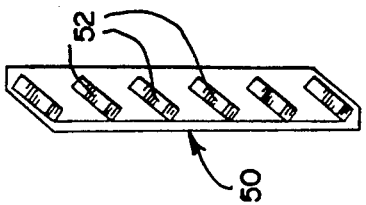
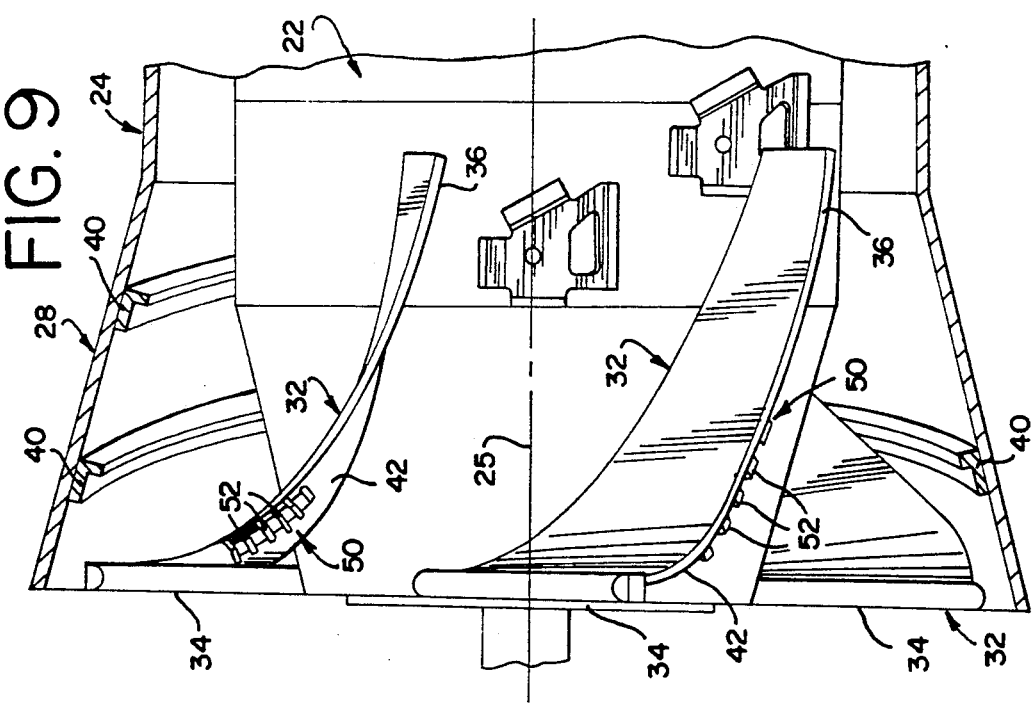

INFEED ASSEMBLY FOR AN AXIAL-FLOW COMBINE

FIELD OF THE INVENTION

The present invention generally relates to combines and, more particularly, to an axial-flow combine having improved infeed assembly offering a more aggressive crop material feeding action capacity of a rotor assembly combine.

BACKGROUND OF THE INVENTION

A common and well-known form of harvesting machine is a rotary combine. Rotary combines are available in various designs and models to perform the basic functions of harvesting, threshing, and cleaning of grain, and other crop materials.

A typical combine includes a crop harvesting apparatus which reaps planted grain stalks and then feeds the grain stalks to a separating or threshing apparatus. The grain stalks or other crop harvested in the field is rearwardly moved from the crop harvesting apparatus and introduced to a threshing assembly by a feeder mechanism.

In an axial-flow combine, the threshing assembly includes a generally tubular rotor casing mounted on the frame of a combine and a driven rotor disposed within the casing in coaxial relationship therewith. The rotor is supported at opposite ends by front and rear bearing assemblies. The rotor and casing have cooperating threshing instrumentalities arranged thereon for separating grain from material other than grain. In such a combine, which has been available for a number of years, the grain is threshed several times repeatedly, but gently, as it spirals around the rotor and passes through openings in the rotor casing.

The ability to transfer crop material from the feeder mechanism to the rotor assembly is a key factor in efficient and effective combine operation. Different types of embodiments of infeed assemblies have been known to be used to transfer crop material from the feeder mechanism to the rotor assembly. U.S. Pat. No. 4,250,896 to R. Wagstaff, et al. discloses an infeed assembly in the form of an auger. Alternatively, U.S. Pat. No. 4,148,328 to R. E. McMillen discloses a bladed impeller driven by the rotor. With either embodiment, a transition housing or section is typically arranged at the forward end of the rotor casing and surrounds the infeed assembly. An inner surface of the transition housing cooperates with the infeed assembly in inducing axially rearward motion to the crop material.

An auger-type infeed assembly offers aggressive advancement of material from one location to another. An auger type infeed mechanism, however, also has drawbacks. For example, an auger-type infeed mechanism tends to plug easily thereby effecting combine efficiency. Moreover, the auger-type infeed mechanism tends to rearwardly move crop material close to the axial center of the rotor and therefore neither combs the crop material into a thin annular mat nor meters the crop material to the rotor assembly.

An impeller blade type infeed assembly offers enhanced radial outward movement of the crop material toward the transition housing of the rotor casing. The radial outward movement of the crop material tends to comb the material into a thin annular mat which is introduced in a metered fashion into the rotor assembly The feeding action of an impeller blade type infeed assembly, however, is less aggressive than that afforded by auger-type infeed assemblies.

When axial-flow combines are used in certain long-stemmed leguminous or grassy crops, such as windowed perennial or annual rye grass, clover and bent grass, there is a potential for such grassy crops to extend partially into the infeed assembly while the remainder of the crop material extends to the feeder mechanism. That portion of the elongated grassy crop material extending into the infeed assembly typically passes over the blade on the auger or of the impeller and tends to hair pin about an outer blade edge and move toward the axis of rotation of the rotor assembly. Some of such crop material tends to wrap about the front rotor assembly bearing.

As will be appreciated, if the crop material becomes tightly wrapped about the rotor bearing assembly, it can impair the operational characteristics of the combine. Crop material wrapping about the rotor bearing assembly has been known to eventually damage the operational components of the rotor by breaking the seals on the bearing assembly and, ultimately, stall the engine. To clean and clear this problem, of course, requires valuable time which is at a premium in a crop harvesting operation. Repair or replacement of a bearing assembly consumes still more valuable harvesting time.

Crop material is fed endwise into the forward end of the infeed assembly in an undershot fashion. The whirling action of the infeed assembly blades has the a tendency to block crop material from entering the infeed assembly. The backlash effect of residual crop material also tends to inhibit crop material from entering the infeed assembly. The tendency of the infeed assembly to reject incoming crop material reduces the full potential of the combine by inhibiting the rotor assembly from operating at its full capacity.

Thus, there is a need and a desire for an infeed assembly which offers an aggressive crop material feeding action commensurate with capacity of the rotor assembly and which tends to move crop material radially outward from the front rotor bearing to facilitate its axially rearward movement through the rotor assembly.

SUMMARY OF THE INVENTION

In view of the above, and in accordance with the present invention, there is provided an improved infeed assembly for an axial flow combine which is mounted for rotation within a transition housing extending forwardly from a stationary rotor casing and having a series of transport vanes arranged about an inner surface thereof for facilitating axially rearward movement of the crop material. The infeed assembly comprises a series of equally spaced blades arranged at a forward end of a rotor and co-axially mounted within the rotor casing. Each blade of the infeed assembly has a leading edge lying in a plane extending substantially normal to the axis of the rotor and swept back relative to the direction of rotor rotation. Each blade has a material engaging surface having a generally concave shape or configuration at a forward section and extending axially rearward from the leading edge of the blade. The concave shape at the leading edge of the blade provides minimal resistance to crop material introduction into the infeed assembly thereby minimizing the backlash effect of residual crop material. From its concave shaped forward section, the blade extends into a relatively flattened section to induce rearward crop material motion. The curved concave and flattened sections of each impeller blade have cross-sectional profiled configurations lying on planes normal to the rotor axial center and which are incrementally swept back at substantially the same angle of crop deflection as the leading edge of the blade to exert an initial and radially outwardly directed force on the material thereby moving the crop material toward the transition housing. An outer edge of each blade rearwardly extends from the leading edge and is angled relative to the transport vanes arranged about the inner surface of the transition housing. The included angle between the outer edge of the impeller blade and the transport vanes varies as the blade extends rearwardly from the leading edge of the blade to induce rearward crop material motion.

A further aspect of this invention involves providing the leading edge of the blade with a rounded configuration. The rounded leading edge allows elongated strands of crop material entering into the infeed assembly but which have not been released from a feeder mechanism, to endwind or slide over the leading edge of the blade as it is drawn rearwardly toward the rotor for threshing. The rounded leading edge of the blade will reduce chopping and hair pinning tendencies normally associated with a sharp outer blade edge thereby tending to promote radial outward movement of the crop material.

In a preferred form, the infeed assembly of the present invention further includes crop handling instrumentalities arranged along the material engaging surface of each blade. The crop handling instrumentalities provide an aggressive circumferential motion to the crop material and reduce crop slippage as the crop material approaches the outer edge of the blade thereby facilitating its axially rearward movement or motions toward the rotor assembly.

In an alternative form of the present invention, the blades are arranged in two sets. Each set of blades preferably includes two blades arranged diametrically opposite from each other. One set of blades has a leading edge extending outwardly from the foremost end of the infeed assembly. The leading edge of the other set of blades are offset axially rearward from the leading edge of an adjacent blade. In this alternative form, the leading edge of each blade is swept back and curved to maintain an advantageous crop material deflection angle along the entire length of the blade.

The foremost end of the infeed assembly may further include an anti-wrap mechanism. In one form, the anti-wrap mechanism includes spiral-like vanes which extend away from the axial center of the rotor and inhibit crop material from winding about a front bearing assembly for the rotor assembly.

The infeed assembly of the present invention embodies beneficial characteristics of both auger and impeller types of infeed assemblies. The infeed assembly design provides a smoother feeding action than available with auger-type feeding systems while providing a more positive feeding action than currently available with known impeller-type feeding assemblies. The blade design offered by the present invention has less chance to chop straw thereby minimizing grain damage. The improved blade design of the infeed assembly also promotes crop material motion away from the axial center of the rotor thereby inhibiting crop material from wrapping about the front rotor bearing.

Numerous other features and advantages of the present invention will become readily apparent from the following detailed description, the accompanying drawings, and the appended claims.

BRIEF DESCRIPTION OF THE DRAWINGS

FIGS. 7 and 8 are plan and side elevational views, respectively, of a crop handling instrumentality;

FIG. 9 is a fragmentary enlarged side elevational view of an infeed assembly similar to FIG. 2 and having crop handling instrumentalities as shown in FIGS. 7 and 8 arranged on a material engaging surface of the blades of the infeed assembly;

FIG. 10 is a fragmentary front elevational view of a blade of the infeed assembly illustrated in FIG. 9;

DETAILED DESCRIPTION OF THE PRESENT INVENTION

Figure 1:
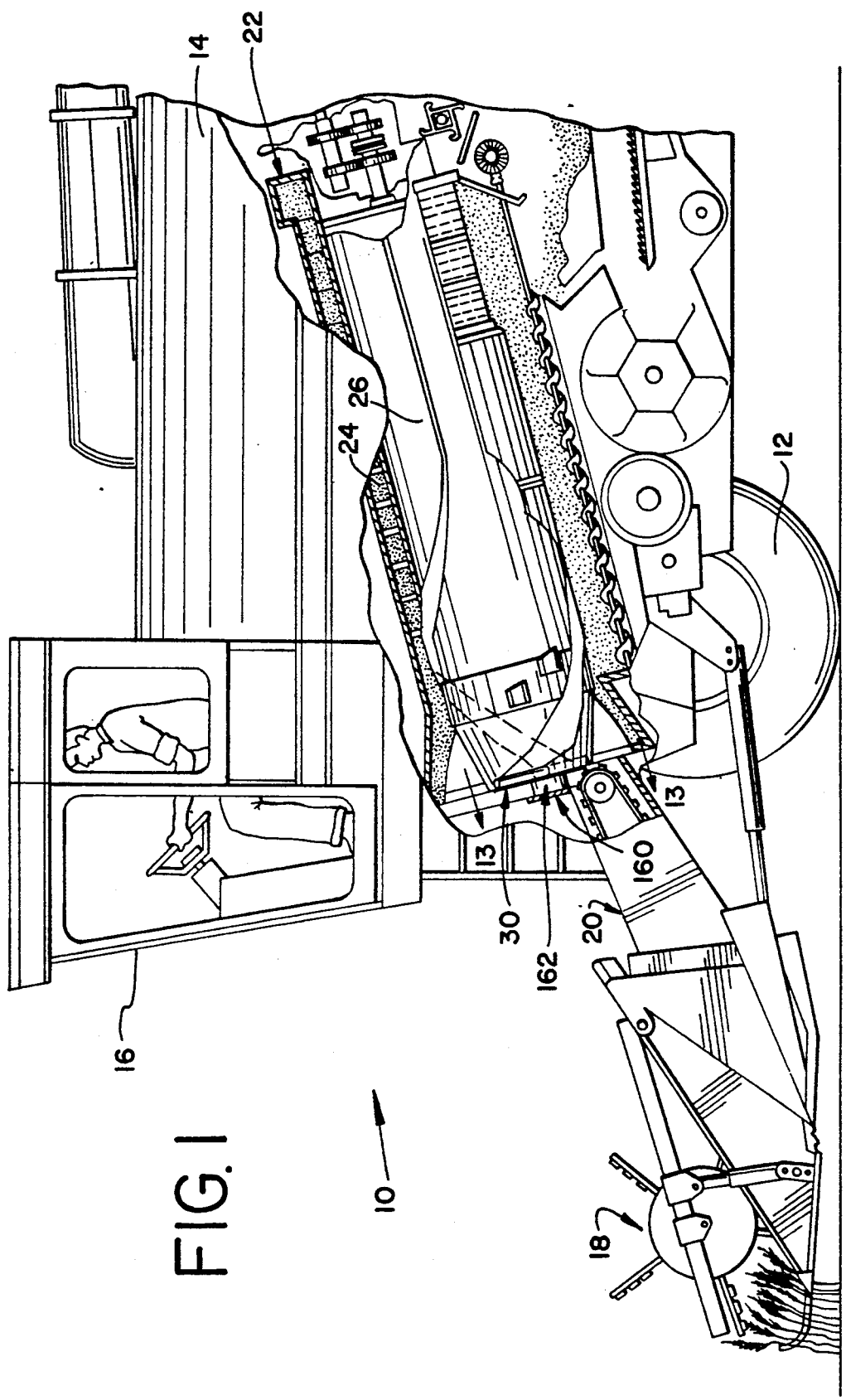
FIG. 1 is a side elevational view, partly in section, of an axial flow-type combine with a major portion of one sidewall being broken away to reveal a rotor assembly having an infeed assembly embodying features of the present invention.

While the present invention is susceptible of embodiment in various forms, there is shown in the drawings and will hereinafter be described, preferred embodiments of the invention with the understanding that the present disclosure is to be considered as an exemplifications of the invention which are not intended to limit the invention to the specific embodiments illustrated.

Referring now to the drawings, wherein like reference numerals indicate like parts throughout the several views, there is shown in FIG. 1 a selfpropelled combine 10 having front drive wheels 12. The combine 10 further includes a body 14 having an interconnected supporting structure or frame which defines an operator station 16.

The combine is operatively powered by an engine (not shown) suitably supported and housed within body 14 and which provides driving power for the combine. The transfer of rotation and power from the engine to various driven components of the combine is of a conventional nature and could include fixed or variable belt or chain drives which are not shown or described herein but are well known in the art.

At its front or forward end, the combine is provided with a crop harvesting apparatus or header 18 which can be of any suitable design. The crop harvesting apparatus 18 cuts and directs crop material toward a crop feeder mechanism 20. The crop feeder mechanism 20 preferably includes a conventional chain and slat conveyor that upwardly and rearwardly moves crop material in a crop layer or mat toward an axialflow rotor assembly 22 which acts to separate and thresh grain from material other than grain.

The rotor assembly 22 is conventionally supported inside the body 14 of the combine 10. As is the case with axial-flow combines of the type hereinafter under consideration, the rotor assembly 22 embodies crop threshing and separating means in a single unit. More specifically, the rotor assembly 22 includes a generally tubular rotor casing or housing 24 mounted in a fore-and-aft direction in the combine along an elongated axis 25 and a generally cylindrical rotor 26 journalled in generally coaxial relationship within the casing 24 by front and rear bearing assemblies (not shown). As viewed from the front of the combine, the direction of rotation of the rotor 26 is counterclockwise.

Figure 2:
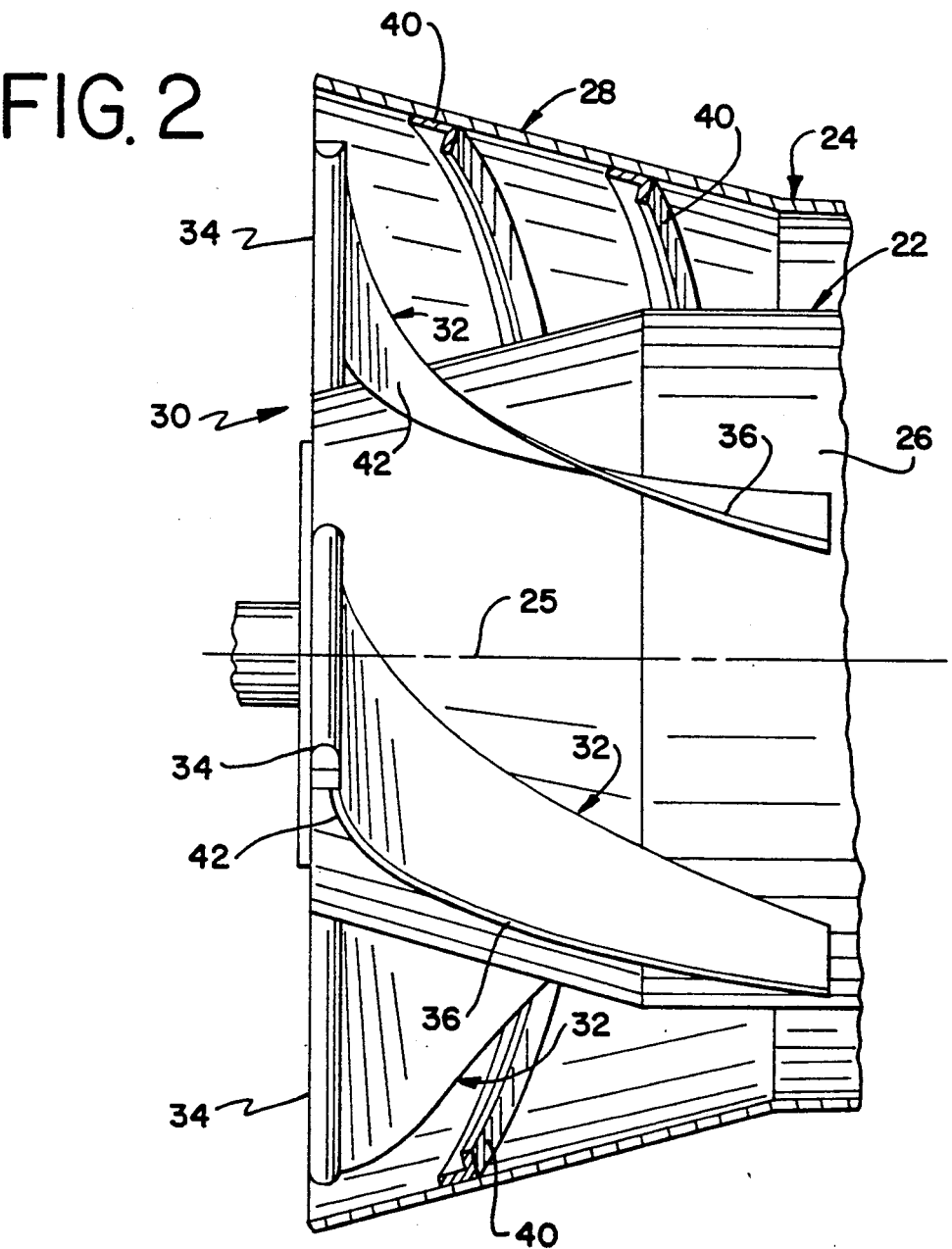
FIG. 2 is a fragmentary and enlarged side sectional view of the infeed assembly of the present invention.

At its forward end, and as seen in FIG. 2, the rotor casing 24 has an open-ended transition section 28 which may be regarded as a forward extension of the casing 24. The open end of the transition section 28 is arranged in crop-receiving relation with the feeder mechanism 20 (FIG. 1). In the preferred embodiment, the transition section 28 is provided with an outwardly flared funnel-like frusto-conical configuration which is suitably secured to the body of the combine. As illustrated, the transition section 28 has a decreasing cross-sectional area in a downstream direction extending between fore-and-aft ends thereof. The configuration of the transition section 28 functions to "funnel" the crop material axially rearwardly through the rotor casing.

According to the present invention, an infeed assembly 30 is provided at a forward end of the rotor for drawing air and crop material into and through the transition section 28. In the preferred embodiment, the infeed assembly 30 is comprised of four substantially identical blades 32 which are equally spaced from each other. It should be appreciated, however, that the infeed assembly can be made up of other than four blades and that the number of blades is primarily determined by design factors such as rotor diameter.

Figure 3:
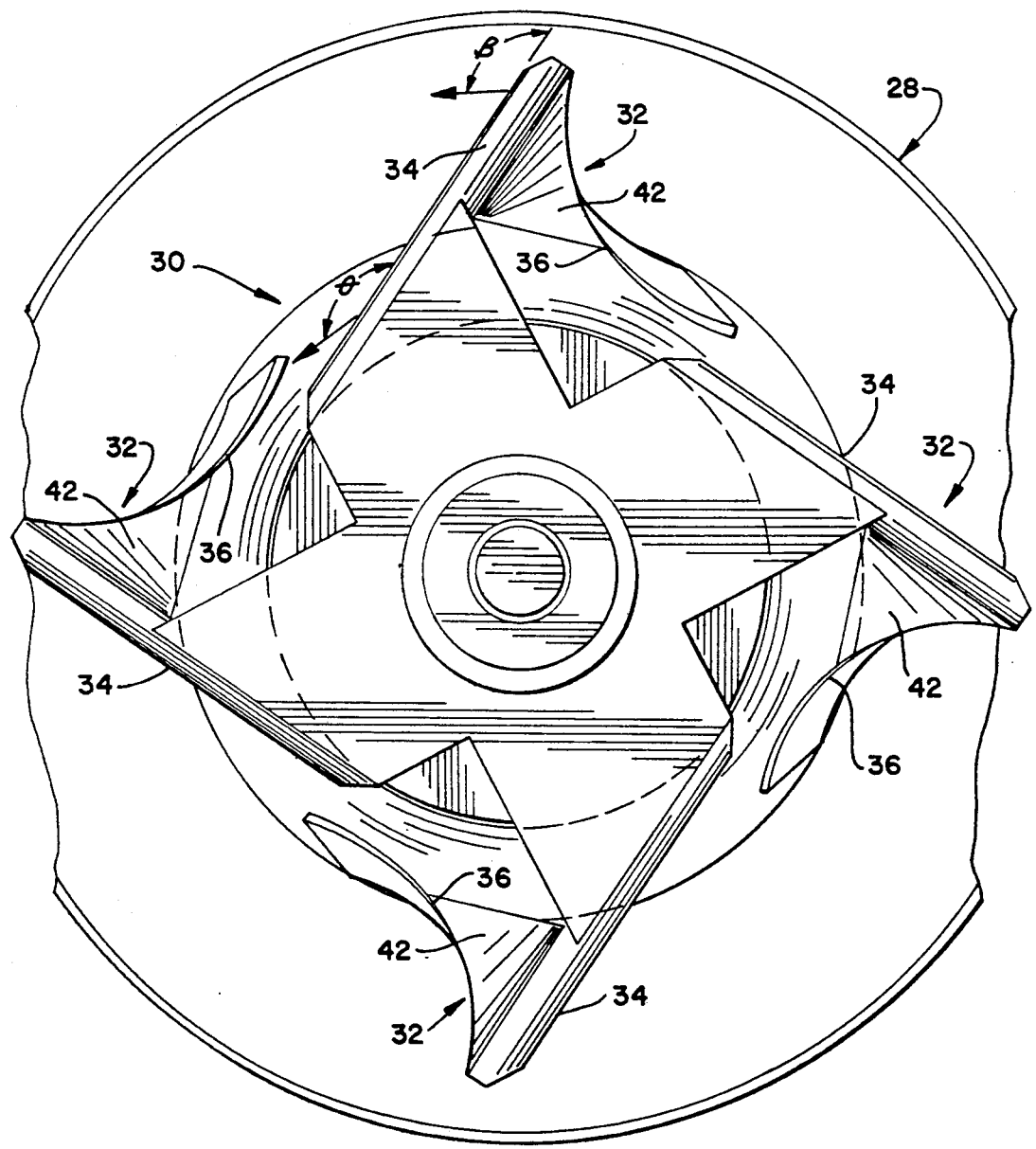
FIG. 3 is an enlarged front elevational view of the infeed assembly of the present invention.

Each blade 32 has a leading edge 34 which lies in a plane extending generally normal to the elongated axis 25 of the rotor 26. As shown in FIG. 3, the leading edge of each blade is swept back relative to the given direction of rotation of the rotor. Notably, the swept back angle of each blade 32 relative to the given direction of rotor rotation provides a greater angle of crop deflection Θ toward an inside edge of the blade which is closer to the axis of rotor rotation than is the angle of crop deflection β provided toward an outer edge of the blade.

Each blade 32 further defines an outer edge 36 which extends rearward from the leading edge 34 of the blade and has a declining slope in the downstream direction of the rotor 26. As will be appreciated, the trace generated by the blades 32 upon rotation of the rotor approximates a cone frustum having a slant angle which is substantially equal to the slant angle of the frusto-conical transition section 28 so that a small annular clearance or opening is defined between the outer edge of the blades and the inner surface of the transition section. It is through this annular clearance or opening that crop material is moved axially rearwardly toward threshing instrumentalities on the rotor assembly.

As shown in FIG. 2, a plurality of spiral transport vanes 40 are supported on an internal wall surface of the transition section 28 and extend into the annular opening or space to facilitate axial rearward movement of the crop material through the transition section 28 of the rotor assembly.

Figure 4:
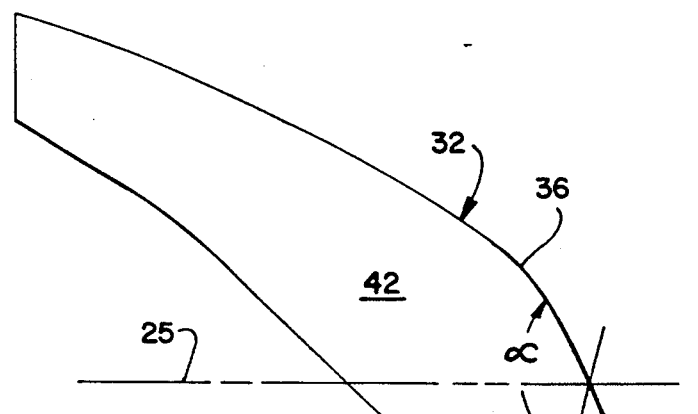
FIGS. 4 through 6 are plan views schematically illustrating changes in orientation between an outside edge of a blade of the infeed assembly and a spiral vane arranged in cooperative relationship therewith.
Figure 5:
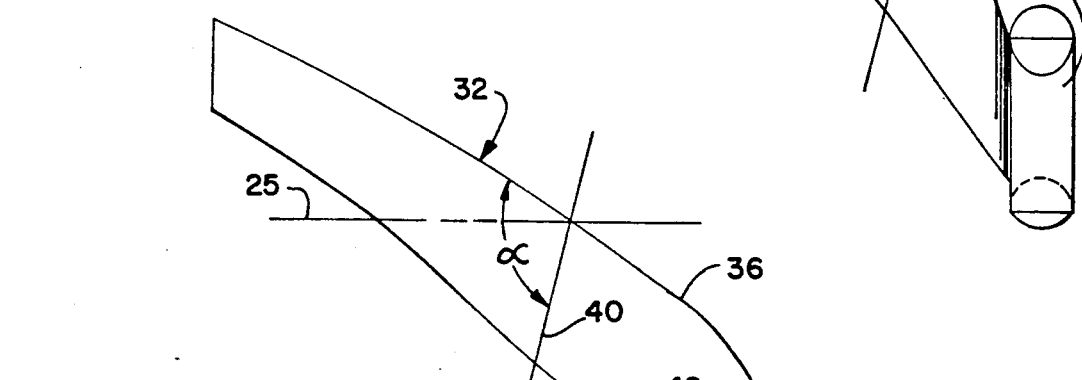
Figure 6:
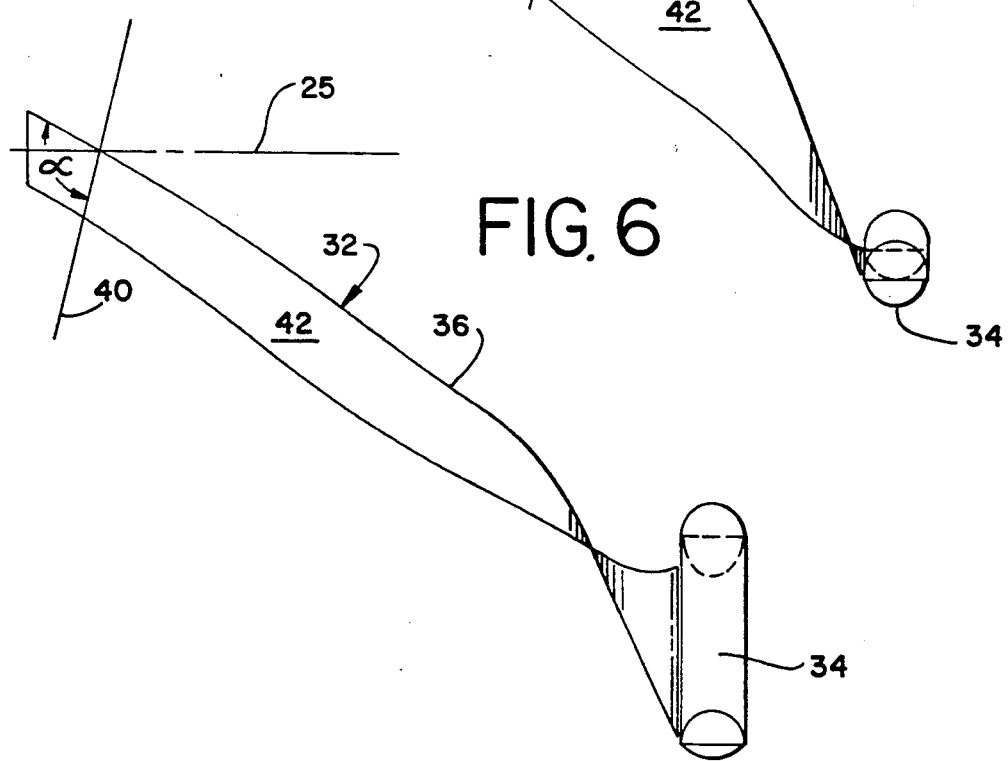

As illustrated in FIGS. 4, 5, and 6, the outer edge 36 of each blade, as it extends rearwardly from the leading edge 34, angles relative to the transport vanes 40 and extends diagonally rearward relative to the elongated axis 25 of the rotor. The included angle $\alpha$ between the outer edge 36 of the blade and the transport vanes 40 varies as the blade 32 extends rearwardly from its leading edge. Preferably, the included angle $\alpha$ established between the outer edge 36 of the blade and a respective transport vane 40 is greater than 90° along the entire outer edge of the blade so as to inhibit chopping or scissor action upon the crop material as it moves rearwardly through the transition section of the rotor assembly.

Preferably, the included angle $\alpha$ between the outer edge 36 of each blade 32 and a respective spiral vane 40 ranges from about 150° to about 100°. In a most preferred form of the invention, the included angle $\alpha$ between the outer edge 36 of each blade and a respective transport vane 40 is larger proximate to the leading edge of the blade than toward a trailing end of the outer edge.

Each blade 32 further includes a material engaging surface 42 having a changing crop engaging configuration as the blade axially extends rearwardly from the leading edge 34. At its foremost end, the material engaging surface 42 has an axially rearward extending and generally concave shaped section. As the blade rearwardly extends from the leading edge 34, the concave shape of the material engaging surface 42 extends into a flatter shaped section. The curved concave and flattened sections of each impeller blade have cross-sectional profiled configurations lying on planes normal to the rotational axis 25. Notably, along a major portion of its length the material engaging surface 42 is incrementally swept back at substantially the same angle of crop deflection as the leading edge of the blade to induce crop material movement radially outward toward the transition section.

As schematically illustrated in FIGS. 2 through 6, the leading edge 34 of each blade 32 has a rounded configuration extending along substantially its entire length. The rounded edge configuration will reduce chopping and hair pinning tendencies of crop material normally associated with a sharp leading edge on the blade.

Turning now to FIGS. 7 and 8, there is schematically shown a crop handling instrumentality 50 which embodies a series of relatively small and raised bar elements 52 which are adapted to engage the crop material passing over the material engaging surface 42 of each blade. As shown, the bar elements 52 extend generally parallel to each other and are angularly offset relative to the elongated axis of the rotor assembly 22.

As shown in FIGS. 9 and 10, the crop handling instrumentality 50 is positioned on the material engaging surface 42 of each blade 32 toward the outer edge 36 thereof to provide an aggressive circumferential/rotary motion which reduces crop slippage as the crop material reaches the outer edge 36 of each blade. Notably, the relatively small bar elements 52 form about a 95° angle with respect to the transport vanes 40 provided on an inner surface of the transition housing 28.

In operation, the transition section 28 of the rotor casing 26 along with the spiral transport vanes 40, secured to its internal surface, cooperate with the infeed assembly 30 to axially and rearwardly move crop material through the rotor assembly. The unique configuration of the blades 32 comprising the infeed assembly provide a smooth and more positive feeding action than has been heretofore attained with less chance to chop straw and damage grain as it moves through the rotor assembly.

The concave shape toward the leading edge of the material engaging surface 42 provides the minimal resistance to crop material entering into the infeed assembly 30 from the feeder mechanism 20. Moreover, the swept back configuration of each blade 32 imparts force to the crop material in a radial direction causing it to move toward the internal surface of the transition housing 28 and into contact with the spiral transport vanes 40. The spiral transport vanes 40 exert a positive force on the crop material moving it axially rearward through the rotor assembly thus allowing additional crop material to be accepted at the foremost end of the rotor assembly.

The crop handling instrumentalities 50 positioned on the material engaging surface 42 toward an outer edge 36 of each blade provide aggressive circumferential rotary motion to the crop material and reduce crop slippage as the crop material reaches the outer edge 36 of the blade.

Another embodiment of an infeed assembly 130 is illustrated in FIGS. 11–14. The infeed assembly 130 is similar in many respects to the infeed assembly 30. As shown, infeed assembly 130 is comprised of four blades 132 equally spaced about a forward end of the rotor assembly for drawing air and crop material into and through the transition section 28. As will be appreciated, however, the infeed assembly 130 can be made up of other than four blades.

The blades 132 of the infeed assembly 130 are arranged in two sets. Each set of blades comprises two blades arranged diametrically opposite to each other. Each blade of the first set of blades has a leading edge 134 which lies in a plane extending generally normal to the elongated axis 25 of the rotor 26. As shown, the leading edge 134 of each blade of the first set of blades extends outwardly from a forward edge of the rotor. Each blade of the second set of blades likewise has a leading edge 134' which lies in a plane extending generally normal to the axis of rotor 26. The leading edge 134' of each blade of the second set of blades is axially rearwardly offset from the leading edge of an adjacent blade. In the illustrated embodiment, a distance of about 115 mm separates the leading edges 134 and 134'.

Figure 12:
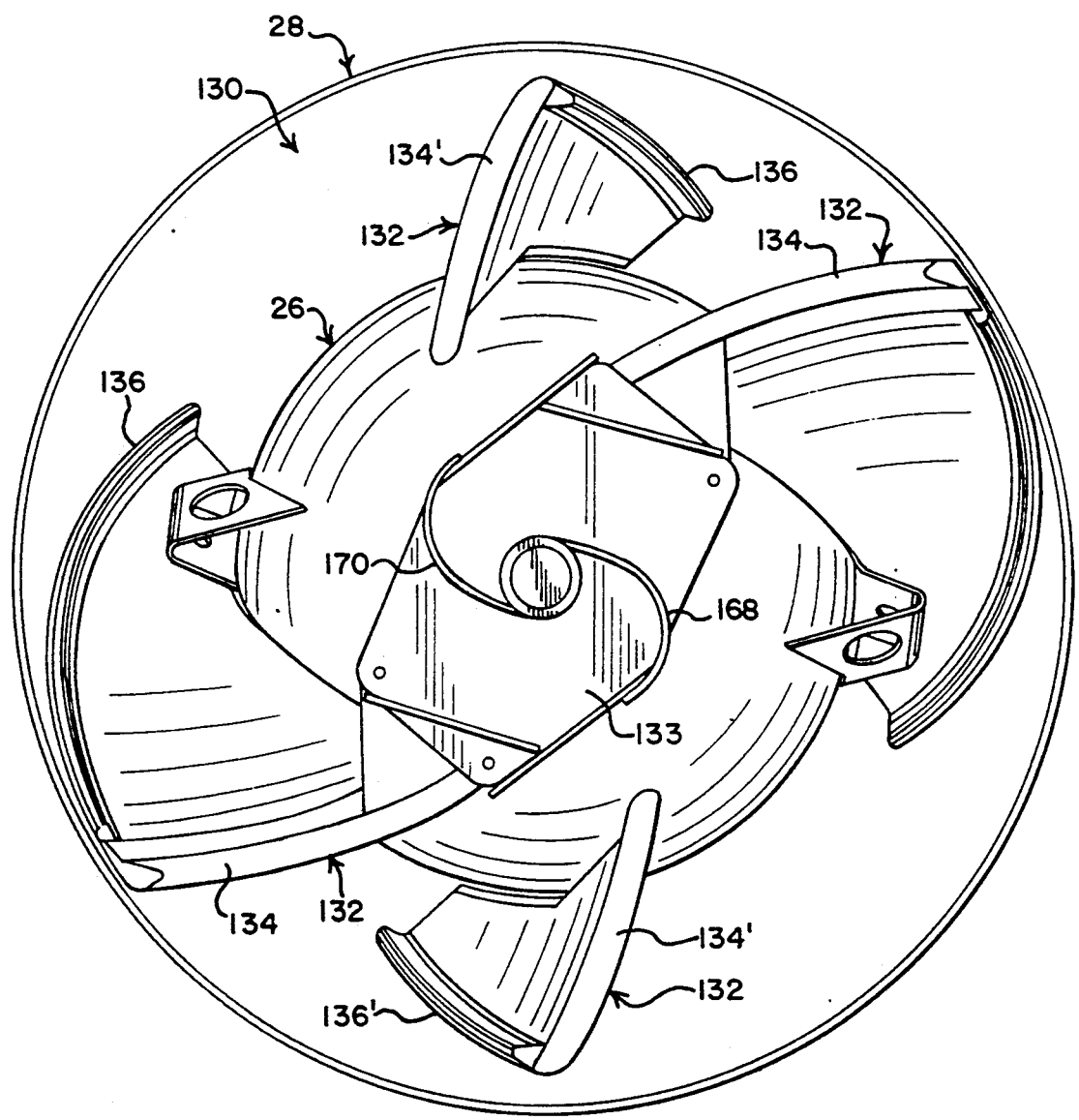
FIG. 12 is a front elevational view of the infeed assembly illustrated in FIG. 11 as arranged within a rotor casing of a combine.

As shown in FIG. 12, the leading edge 134, 134' of each blade of the infeed assembly is swept back relative to the given direction of rotation of the rotor. In this second embodiment, a radial innermost base of the first set of leading edges 134 is disposed closer to the axial center of rotor 26 than in the first embodiment. As shown, a brace 133 is provided at a forward end of the rotor assembly to facilitate support and connection of one set of blades to the rotor assembly. The other set of blades is suitably connected to and supported by the rotor assembly in a conventional manner. In this second embodiment, a smaller nose diameter is provided at the forward end of the rotor assembly as compared to the first embodiment.

The leading edges 134 and 134' each have a generally arcuate configuration to maintain an advantageous angle of crop deflection along substantially the entire length of the leading edge. As will be appreciated, the arcuate configuration is such that a greater angle of crop deflection is provided toward an inside edge of the blade which is closer to the axis of rotor rotation than is the angle of crop deflection provided toward an outer edge of the blade.

Each blade 132 further defines an outer edge 136 which extends rearward from a respective leading edge of the blade and has a declining slope in the downstream direction of the rotor 26. As will be appreciated, the trace generated by the blades 132 upon rotation of the rotor approximates a cone frustum having a slant angle which is substantially equal to the slant angle of the conical transition section 28 such that a small annular clearance or opening is defined between the outer edge of the blades 132 and the inner surface of the transition section.

Figure 14:
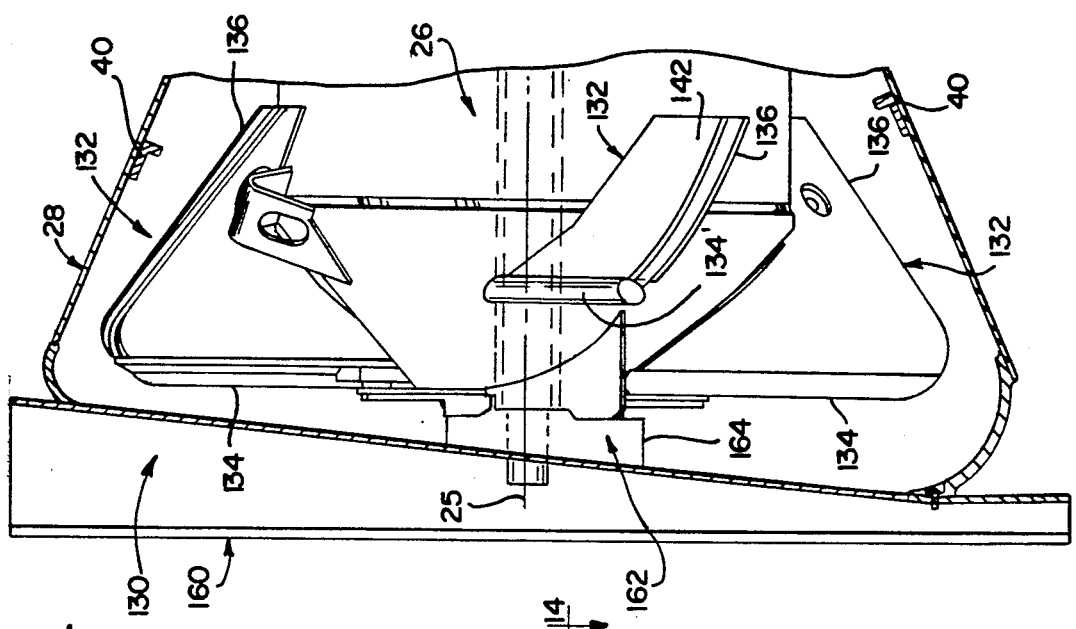
FIG. 14 is a sectional view of the infeed assembly taken along line 14—14 of FIG. 13.

As shown in FIG. 14, the outer edge of each blade 132, as it extends rearwardly from a respective leading edge, angles relative to the transport vanes 40 and extends diagonally rearward relative to the elongated axis 25 of the rotor. The included angle between the outer edge 136 of the blades and a respective vane 40 is similar to that discussed in detail above regarding the first embodiment of the infeed assembly.

Each blade 132 further includes a material engaging surface 142 having a changing crop engaging configuration as the blade axially extends rearward from a respective leading edge. At its foremost end, the material engaging surface has an axially rearward extending and generally curved section. As the blade rearwardly extends from the leading edge, the curved section of the material engaging surface extends into a flatter shaped section. The concave and flattened sections of each impeller blade have cross-sectional profiled configurations lying on planes normal to the rotational axis 25 of the rotor. Notably, along a major portion of its length, the material engaging surface 42 is incrementally swept back at substantially the same angle of crop deflection as the leading edge of the blade to induce scrap material movement radially outward toward the transition section.

As in the first embodiment, the leading edge 134 of each blade 132 preferably has a rounded configuration extending along the entire length thereof. The rounded edge configuration will reduce chopping and hair-pinning tendencies of crop of material normally associated with a sharp leading edge of the blade.

Moreover, each blade 132 of the infeed assembly 130 may be provided with a crop handling instrumentality similar to that illustrated with respect to the first embodiment of the invention. The crop handling instrumentality associated with each blade 132 is provided to engage the crop material passing over the material engaging surface 142 of a respective blade.

Figure 13:
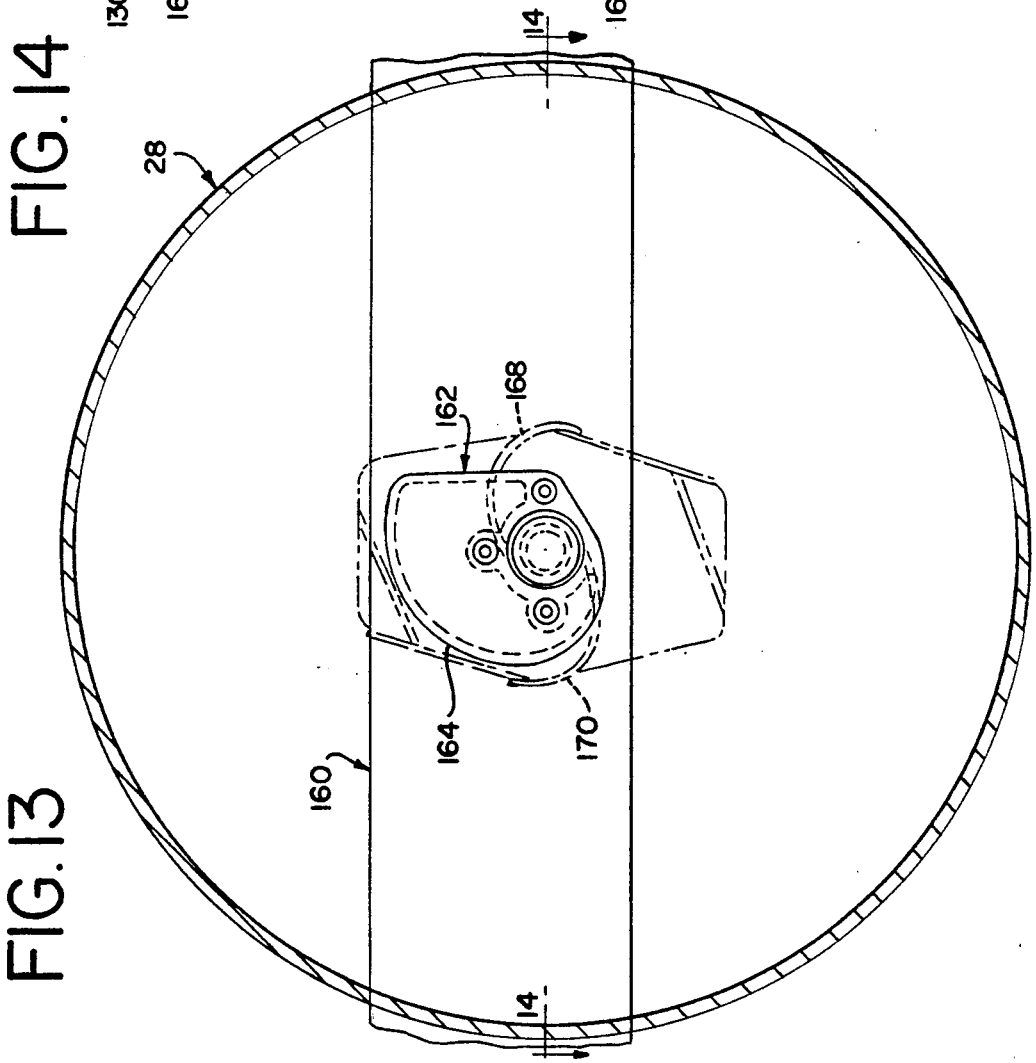
FIG. 13 is a sectional view taken along line 13—13 of FIG. 1.

A forward end of the rotor assembly 22 is conventionally and rotatably supported in a shielded rotor bearing assembly (not shown). As illustrated in FIGS. 1, 12 and 13, the bearing assembly is supported approximate midlength of a transverse rotor support member 160 secured to the frame of the combine. A rotor bearing casting 162 provided on the support member 160 shields and supports the bearing assembly and defines a generally kidney shaped rotor peripheral surface 164.

Figure 11:
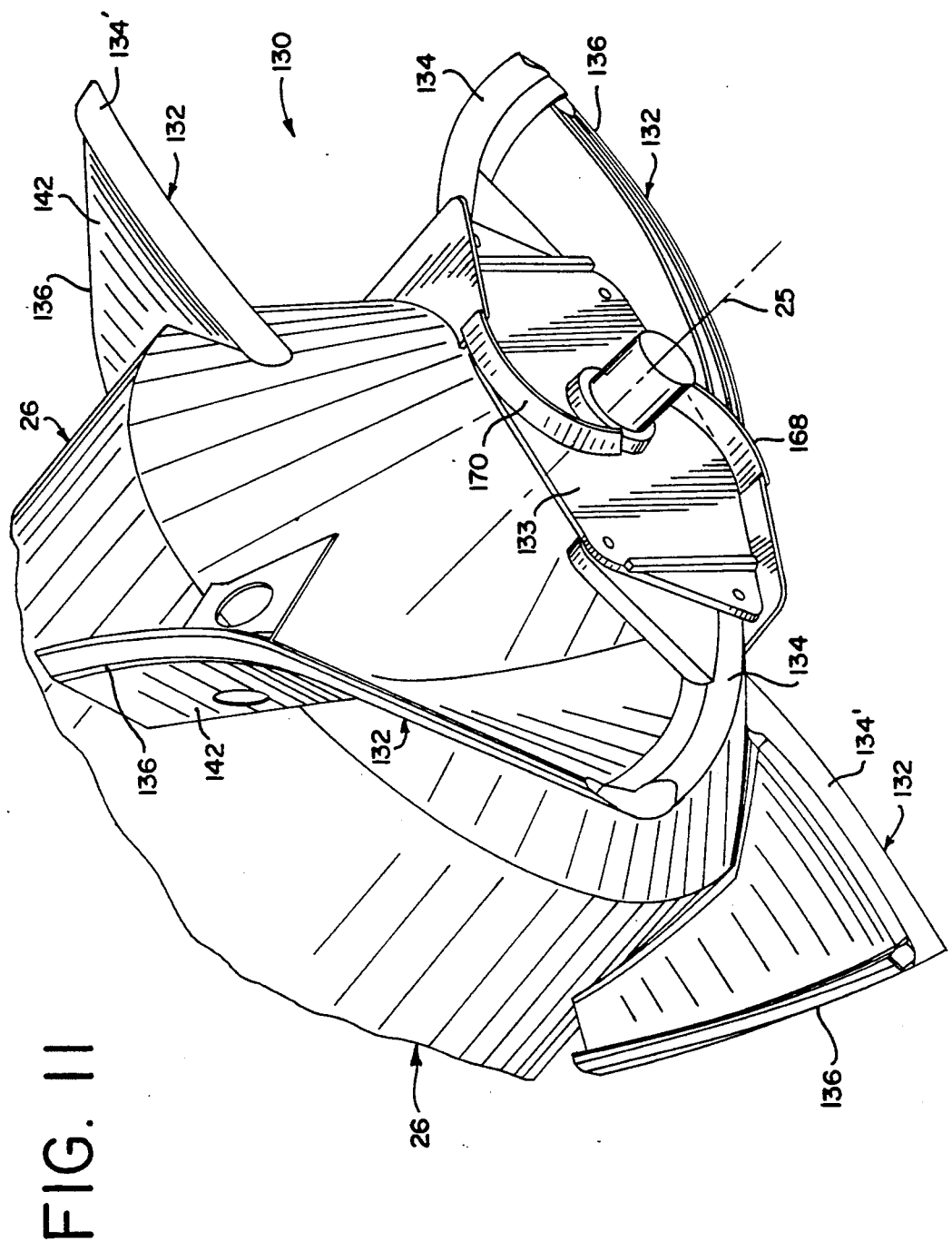
FIG. 11 is a perspective view of an alternative embodiment of an infeed assembly.

As shown in FIGS. 11 and 12, the infeed assembly 130 is provided with anti-wrap vanes 168 and 70 at a forward end thereof. As shown, the anti-wrap vanes 168 and 170 extend in a general spiral fashion away from the rotor center to inhibit crop material from schematically winding about the forward end of the rotor assembly. As shown in FIG. 13, the anti-wrap vanes 168 and 170 are configured to define an included angle of greater than 90° between the vanes and the peripheral surface 164 of casting 162 as the vanes rotate about and relative to the casting 162.

With particular reference to the second embodiment of the invention, the staggered arrangement of the leading edges 134, 134' of the blades 132 facilitate crop material flow into the infeed assembly by allowing additional open area into which crop material may be introduced. Providing four equally spaced blades furthermore enhances performance by improving radial support of the crop material rearwardly advancing through the transition section. Four blades on the infeed assembly also ingest crop at the rotor front face at high through puts. A smaller diameter at the forward end of the infeed assembly furthermore facilitates entry of crop material into the infeed assembly.

A smaller cone diameter at a forward end of the infeed assembly provide a longer leading edge 134, 134' on each of the blades 132. The curved or arcuate configuration of the leading edge 134, 134' compensates for the increase in blade length and maintains an advantageous crop deflection angle along the entire length of the blade. Moreover, the anti-wrap vanes 168 and 170 on the forward end of the infeed assembly acts in cooperation with the kidney shaped cavity 164 of casting 162 to shed material away from the axial center of the rotor thereby inhibiting material from wrapping about a forward end thereof.

The rounded configuration on the leading edge of each blade allows long straw that has entered the infeed assembly, but has not cleared the feeder mechanism 20, to slide along, over, and relative to the leading edge of the blade while advancing into the infeed assembly. This rounded edge configuration will reduce chopping and hair pinning tendencies of the blade thereby inhibiting the crop material from winding around the front rotor bearing. Instead, the straw is permitted to endwind over the leading edge and advance into the rotor assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An axial-flow combine comprising:
   an elongated generally cylindrical rotor casing provided at a forward end with a transition section designed for endwise reception of crop material;
   a series of transport vanes provided on an inner surface of said transition section;
   a rotor coaxially mounted within said casing for rotation about an elongated axis in a given direction; and
   an infeed assembly arranged at a forward end of and for rotation with said rotor, said infeed assembly comprising a series of equally spaced blades, with each blade having a leading edge lying in a plane extending normal to the axis of the rotor and swept back relative to said given direction of rotor rotation, a rearwardly extending outer edge that angles relative to the transport vanes in varying degrees as the blade extends rearwardly from its leading edge and extends diagonally rearward relative to the elongated axis of the rotor, and a material engaging surface having a generally concave shaped section extending axially rearward from the leading edge of the blade to provide minimal resistance to the crop material introduced to the transition section of the rotor casing and which blends into a flatter shaped section extending to a terminal end of the blade and which is incrementally swept back at substantially the same angle of crop deflection as the leading edge of the blade to induce radially outward crop material movement toward the transition section.

2. The axial-flow combine according to claim 1 wherein the leading edge of each blade is provided with a rounded configuration such that the crop material entering the infeed assembly is permitted to endwind over the leading edge of a respective blade as the crop material advances toward the rotor.

3. The axial-flow combine according to claim 1 further including a crop handling instrumentality arranged along the material engaging surface of each blade to provide aggressive circumferential motion to and reduce slippage as the crop material approaches the outer edge of the blade.

4. An axial flow combine comprising:
   an elongated generally cylindrical rotor casing provided at a forward end with a frusto-conically shaped section designed for endwise reception of crop material;
   a rotor coaxially mounted within said casing for rotation about an elongated axis in a given direction of rotation; and
   an infeed assembly affixed to a forward end of said rotor, said infeed assembly comprising a series of equally spaced impeller blades for drawing crop material and air into the transition section, each impeller blade having a leading edge lying in a plane extending generally normal to the axis of rotation of the rotor and swept back relative to said given direction of rotor rotation, a rearwardly extending outer edge configured to complement the frusto-conically shaped transition section and that forms an obtuse angle relative to the transport vanes to inhibit imparting a scissor-like action to the crop material and which changes as the blade rearwardly extends from the leading edge thereof, and a material engaging surface having an axially rearwardly curved shaped section extending from the leading edge of the blade and which blends into a relatively flat shaped section extending to a terminal end of the blade and which is incrementally swept back at substantially the same angle as the leading edge to induce crop material movement outwardly toward the transition section.

5. An axial flow combine comprising:
   a forward-and-aft extending generally cylindrical rotor casing provided at a forward end with a transition section designed to endwise receive crop material;
   a series of transport vanes provided on an inner surface of said transition section;
   a rotor coaxially mounted within said casing for rotation about an elongated axis in a given direction, and
   an infeed assembly arranged at a forward end of and for rotation with said rotor, said infeed assembly comprising a series of equally spaced blades each blade having a leading edge which is offset in a fore-and-aft direction relative to an adjacent blade and lying in a plane extending normal to the axis of the rotor, the leading edge of each blade having an arcuate configuration which is swept back relative to a given direction of rotor rotation, an outer edge extending rearwardly from the leading edge and diagonally relative to the elongated axis of the rotor, and a material engaging surface having a curved section extending rearwardly from the leading edge of the blade and which bends into a flatter section extending to a terminal end of the blade, the curved section of the blades and the offset relation of the leading edges providing minimal resistance to crop material introduced to the transition section of the rotor casing, with the flatter section of the blade having cross sectional profiled configurations lying on planes normal to the rotational axis of the rotor and is incrementally swept back at substantially the same angle of crop deflection as the leading edge of the blade to induce radially outward crop material movement toward the transition section.

6. The axial-flow combine according to claim 5 further including anti-wrap means provided at a forward end and for rotation with the rotor for impelling crop material away from the axial center of the rotor.

7. The axial-flow combine according to claim 6 wherein the leading edge of each blade has a generally rounded configuration for promoting like passage of crop material therepast.

* * * * *